United States Patent [19]

Ohara et al.

[11] Patent Number: 5,731,639
[45] Date of Patent: Mar. 24, 1998

[54] APPARATUS FOR CONNECTING POWER SOURCES WITH PLUG-IN UNIT

[75] Inventors: Katsuichi Ohara; Kanta Yamamoto, both of Kawasaki, Japan

[73] Assignee: Fujitsu Limited, Kawasaki, Japan

[21] Appl. No.: 210,042

[22] Filed: Mar. 17, 1994

[30] Foreign Application Priority Data

Sep. 20, 1993 [JP] Japan ................................ 5-257585

[51] Int. Cl.$^6$ ........................................................ H02J 1/00
[52] U.S. Cl. ........................................... 307/38; 307/41
[58] Field of Search ............................. 307/38, 39, 40, 307/41, 18, 29, 19, 80, 81, 85, 86

[56] References Cited

U.S. PATENT DOCUMENTS

| | | | |
|---|---|---|---|
| 4,323,789 | 4/1982 | Dion | 307/81 |
| 4,449,056 | 5/1984 | Shibazaki | 307/38 |
| 4,663,539 | 5/1987 | Sharp et al. | 307/38 |
| 5,268,592 | 12/1993 | Bellamy et al. | 307/43 |
| 5,384,490 | 1/1995 | Swartz, Jr. | 307/38 |

*Primary Examiner*—William M. Shoop, Jr.
*Assistant Examiner*—Jonathan S. Kaplan
*Attorney, Agent, or Firm*—Greer, Burns & Crain, Ltd.

[57] ABSTRACT

An apparatus for connecting power sources to a plug-in unit has a plug-in connector and a plurality of connection control circuits. Terminal pins of the plug-in connector are connected simultaneously to a negative power source, a GND and a positive power source. When the negative power source and the GND are connected, a first connection control circuit is turned ON and connects the negative power source to a first load circuit. A second connection control circuit is turned on in response to an input from the negative power source supplied to the first load circuit, and supplies a GND signal to a third connection control circuit. The third connection control circuit is turned ON when the GND signal is supplied to the positive power source, and connects the positive power source to a second load circuit.

14 Claims, 6 Drawing Sheets

2 STAGES

3 STAGES

4 STAGES

HIGH: GND
MIDDLE: POWER SOURCE (+); POWER SOURCE (−)
LOW: SIGNAL; POWER SOURCE (+); POWER SOURCE (−)

APPARATUS FOR CONNECTING POWER SOURCES WITH PLUG-IN UNIT

BACKGROUND OF THE INVENTION

1. Field of the Invention

This invention relates to a plug-in system, such as a kind of communication/transmission apparatus, for example, for mounting a circuit unit on a parent apparatus which contains power sources in a plug-in manner as the occasion demands and for connecting a circuit unit with power sources. More particularly, this invention relates to an apparatus for connecting power sources with a plug-in unit which contains a plurality of circuit elements to be supplied the outputs of the power sources for operation in a predetermined order.

2. Description of the Related Art

There is a transmission apparatus for example, constituted by a plug-in system which includes a circuit unit mounted on and connected with a parent apparatus containing a power source in use as the occasion demands. In such a plug-in system, a circuit units, i.e., plug-in unit, can be mounted on/removed from the parent apparatus by an inserting/pulling operation.

When the plug-in unit has a circuit containing LSI (large scale integration) which uses GaAs (gallium arsenide) semiconductor, for example, most of the circuit elements of the plug-in unit need a plurality of electric power inputs from power sources with different voltages and must be supplied the power inputs in a predetermined order. In such a case, if the power inputs are not supplied correctly in a predetermined order, the circuit in the plug-in unit operates falsely or a device constituted the circuit is damaged. This is not limited only to the case of where the plug-in unit has a circuit containing LSI which uses GaAs semiconductor, but in many cases, the circuit elements of the plug-in unit need a plurality of power inputs from power sources with different voltages and must be supplied the power inputs in a predetermined order.

In such a case, a conventional plug-in system ensures the order of supplying the power inputs as follows.

In general, a multi-pin connector having a large number of terminal pins arranged in two dimensional distribution is used as a plug-in connector of a plug-in unit. Such a multi-pin connector is sometimes referred to as a sheet type connector, for example. In order to provide the order of supplying the power inputs, an arrangement of pins is set up for establishing connection in the predetermined order, for example, a common voltage or ground potential (hereinafter refers to "GND")→+5V, by utilizing lengths of terminal elements, such as terminal pins, of the multi-pin connector. Referring FIGS. 1A through 1C, examples of a structure which determines connecting order by differences in height of terminal pins will be described. FIGS. 1A, 1B and 1C show typical examples of forming height differences of two stages, three stages and four stages on terminal pins, respectively, so that the height differences provide timelags in making contact and to establish a connecting order. In such a case, a height of a terminal pin P is limited by size and structure of the multi-pin connector. That is, the maximum and minimum heights of the terminal pins are determined by a design of a multi-pin connector. Therefore, the maximum difference (a), i.e., the difference between the maximum and minimum heights, is a fixed length. The stages are formed by dividing the maximum difference (a) according to the number of the required stages of the terminal pins.

In an example shown in FIG. 2, the terminal pins of the multi-pin connector form three stages in height. The one or more tallest pins are used for a GND. The middle height pins having the second height are used for positive (+) and negative (−) power sources, e.g., a positive power source of +5 volts and a negative power source of −5.2 volts. The shortest pins are used for a signal group, i.e., a signal, a positive (+) power source and a negative (−) power source. When a plug-in unit using the multi-pin connector of this type is mounted, the GND is connected first, the power source of +5 volts and the power source of −5.2 volts are connected subsequently, and the signal, the positive power source and the negative power source are connected last.

When, however, an IC (integrated circuit) which needs two or more voltages of the power source and has a designated order of connecting power sources, such as a GaAs-LSI, is used for a circuit in a plug-in unit, and two or more power sources are assigned for pins of the same height, e.g., the middle height pins of FIG. 2, an order of the beginnings of supplying power sources is not assured, which is undesirably.

On the other hand, when the number of height stages of the terminal pins of the multi-pin connector is increased to four or more to solve such a problem, it is natural that the height difference becomes more narrow, as shown in FIG. 1C. Thus, the effective timelags based on the height difference of the terminal pins can not be obtained due to the manner in which the plug-in unit is inserted or bending of a back board which holds parts of a connector on the receptacle side (parent apparatus), for example. As a practical matter, the effective height difference is limited to about three stages.

SUMMARY OF THE INVENTION

An object of this invention is to provide an apparatus for connecting power sources with a plug-in unit capable of effectively connecting a plurality of power sources with a plurality of circuit elements in a plug-in unit in a predetermined order on using a multi-pin connector with a smaller number of heights of the terminal pins.

An apparatus for connecting power sources with a plug-in unit according to the present invention ensures an electronic connecting order even for terminal pins which are physically connected simultaneously. The power source connecting apparatus of the present invention controls a connecting order by connecting a power source circuit for one terminal in electronically in response to the power input from the other terminal.

The power source connecting apparatus of the present invention includes a plug-in connector, connection control circuits and load circuits.

A plug-in connector is a multi-pin connector which has a plurality of terminal pins with the same size or height. The terminal pins are connected to a plurality of power source lines. When the plug-in connector is connected, the terminal pins are connected to corresponding lines, e.g., a negative power source, a GND and a positive power source of an external parent apparatus at the same time.

It is assumed that there are a first and a second load circuit. The first load circuit is operated by using a negative power source and the second load circuit is operated by using a positive power source. In this case, the output of the negative power source must be supplied to the first load circuit prior to supplying the output of the positive power source to the first load circuit.

The first connection control circuit controls the turn ON/turn OFF of the supply of an external negative power input from the first power source line to the first load circuit.

The external negative power input is supplied to the first power source line of the plug-in unit through the plug-in connector. When the plug-in connector connects the external GND to the second power source line which is a GND line in the plug-in unit, the second connection control circuit is turned ON by the control signal of the external GND and connects the negative power source to the first load circuit.

The second connection control circuit controls the turn ON/turn OFF of the connection of the external GND as the control signal for the third connection control circuit. The second connection control circuit is turned ON by the control signal of negative power source input supplied to the first load circuit resulting from the turn ON operation of the first connection control circuit and connects the external GND to the third connection control circuit.

The third connection control circuit controls the turn ON/turn OFF of the supply of the external positive power source input to the second load circuit. The external positive power input is supplied to the fourth power source line of the plug-in unit through the plug-in connector. The third connection control circuit is turned ON by the control signal of external GND supplied to the third connection control circuit through the GND line resulting from the turn ON operation of the second connection control circuit and connects the positive power source to the second load circuit.

The other connection control circuit may be provided for supplying the power input connected in a predetermined order to the load circuits when the connection is established completely. In this case, the other connection circuit can be constructed with the method of making a timelag or connecting sequence by forming stages defined by height differences of the terminal pins.

The first and second load circuits may be circuits whose power supplying order is determined either by a characteristic of a device, e.g., GaAs-LSI and the like, or by a type of a supplied signal. The connection control circuit may include an electronic switch such as a semiconductor switch and may also include a photocoupler consisting of a light emitting element and a photosensitive semiconductor switch.

Further, a multi-stage construction can be formed by combining the same constructions in cascade and many power sources can be supplied in a predetermined order.

According to the power source connecting apparatus for a plug-in unit of the present invention, since the power supplying paths formed by a plurality of lines which are connected by the synchronously connected terminal pins of a plug-in connector are controlled by a connection control circuit and therefore the line is connected in response to the connection of the other line, connecting power sources to load circuits in a predetermined order can be established.

If the connecting apparatus further provides one or more of the other connection control circuits for supplying an output of a power source to a load circuit other than the above described connection control circuit after connection of the power sources in a predetermined order, it is possible to supply the outputs of power sources to load circuits. Since there is no need of utilizing a height difference of terminal pins of a plug-in connector for controlling the timelag on the connection of the power sources, the height difference can be utilized for the operation of the other connection control circuit after connection of the power source.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

There will now be described embodiments of an apparatus for connecting power sources with a plug-in unit according to the present invention with reference to the accompanying drawings.

First Embodiment

Figure 1A:
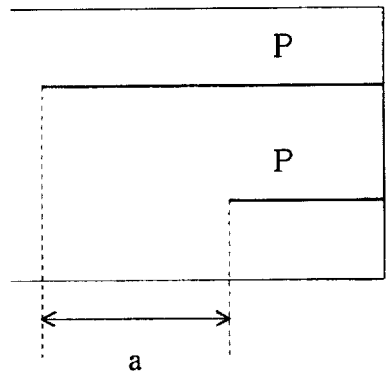
FIGS. 1A, 1B and 1C are typical diagrams showing the pin constructions of the conventional plug-in connectors having two, three and four stages of height differences, respectively.
Figure 1B:
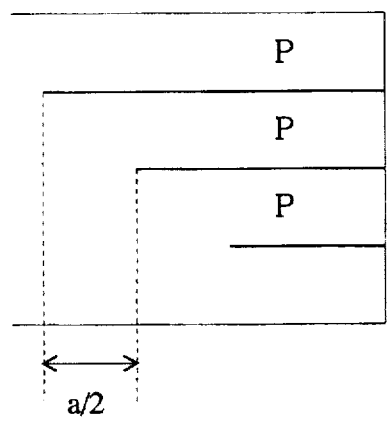
Figure 1C:
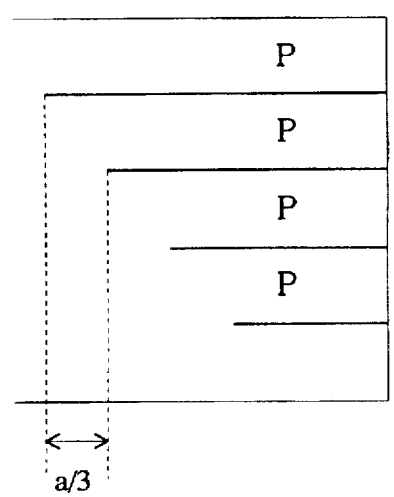
Figure 2:
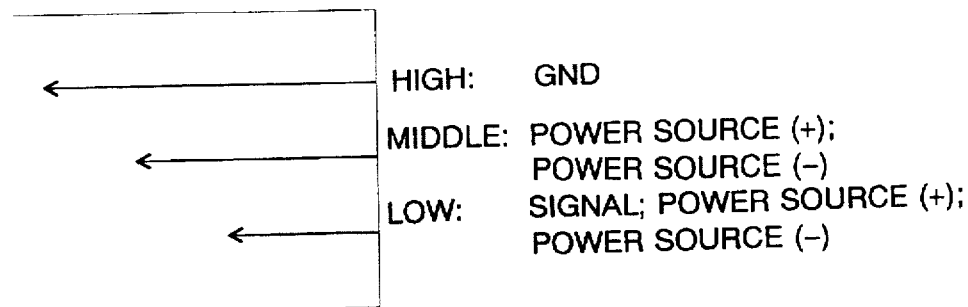
FIG. 2 is a typical diagram showing specific example of uses for the terminal pins having three stages in case of the conventional plug-in connector.
Figure 3:
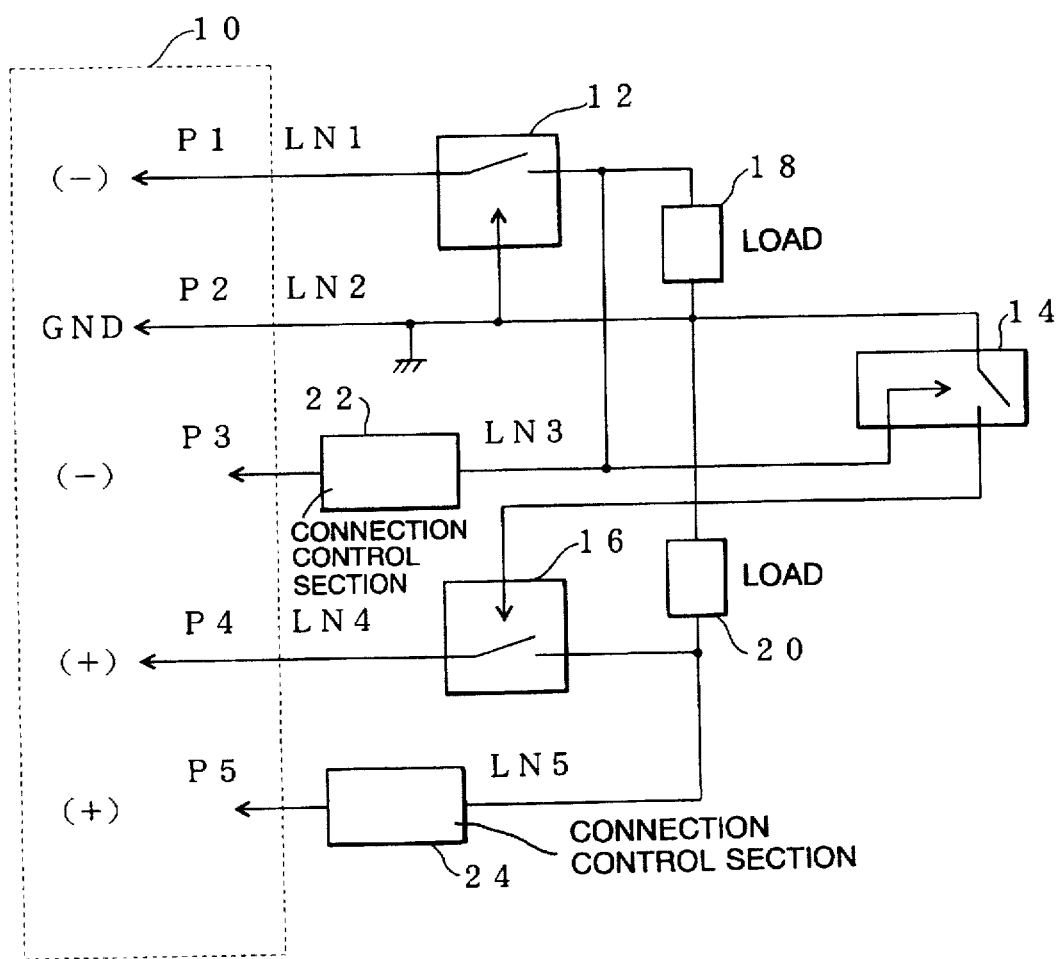
FIG. 3 is a block diagram showing the construction of an apparatus for connecting power sources with a plug-in unit according to a first embodiment of the present invention.

The construction of an apparatus for connecting power sources with a plug-in unit according to a first embodiment of the present invention is shown in FIG. 3.

The power source connecting apparatus for a plug-in unit shown in FIG. 3 includes a plug-in connector 10, connection control circuits 12, 14, 16, 22, 24, load circuits 18 and 20.

The plug-in connector 10 is a multi-pin connector having high terminal pins P1, P2 and P4 of a tall size and low terminal pins P3 and P5 of a short size. All the terminal pins P1, P2 and P4 has the same height. All the terminal pins P3 and P5 has the same height. The terminal pins P1, P2 and P4 are taller than the terminal pins P3 and P5.

The terminal pins P1, P2 and P4 are connected to respective lines LN1, LN2 and LN4 in the plug-in unit. The terminal pins P1, P2 and P4 are connected synchronously to a negative (−) power source, a GND and a positive (+) power source, respectively, of an external circuit, i.e., a parent apparatus.

The load circuit 18 uses the negative (−) power source and the load circuit 20 uses the positive (+) power source. In this case, the negative power source must be supplied to the load circuit 18 prior to supplying the positive power source to the load circuit 20.

The connection control circuit 12 controls the turn ON/turn OFF of the supply of an external negative power input from the line LN1 to the load circuit 18. The external negative power input is supplied to the line LN1 of the plug-in unit through the plug-in connector 10. When the plug-in connector 10 connects the external GND to the line LN2 which is a GND line in the plug-in unit, the connection control circuit 12 is turned ON by the control signal of the external GND and connects the negative power source to the load circuit 18.

The connection control circuit 14 controls the turn ON/turn OFF of the connection of external GND as the control signal for the connection control circuit 16. The connection control circuit 14 is turned ON by the. control signal of negative power source input supplied to the load circuit 18 resulting from the turn ON operation of the connection control circuit 12 and connects the external GND to the connection control circuit 16.

The connection control circuit 16 controls the turn ON/turn OFF of the supply of the external positive power source input to the load circuit 20. The external positive power input is supplied to the line LN4 of the plug-in unit through the plug-in connector 10. The connection control circuit 16 is turned ON by the control signal of the external GND potential supplied to the connection control circuit 16 through the GND line resulted from the turn ON operation of the connection control circuit 14 and connects the positive power source to the load circuit 20.

The terminal pins P3 and P4 of the plug-in connector 10 are connected the lines LN3 and LN5, respectively. When plug-in connecter 10 is connected, the terminal pins P3 and P5 are connected simultaneously and after the connection of the terminal pins P1, P2 and P4.

The connection control circuit 22 connects the negative power input from terminal pin P3 of the plug-in connector 10 to the load circuit 18 through the line LN3 and maintains a predetermined condition of power supplying to the load circuit 18.

The connection control circuit 24 connects the positive power input from terminal pin P5 of the plug-in connector 10 to the load circuit 20 through the line LN5 and maintains a predetermined condition of power supplying to the load circuit 20.

The load circuits 18 and 20 may be circuits whose power supplying order is determined either by a characteristic of a device, e.g., GaAs-LSI and the like, or by a type of a supplied signal. The connection control circuits 12, 14 and 16 may include an electronic switch such as a semiconductor switch and may also include a photocoupler consisting of a light emitting element and a photosensitive semiconductor switch. The connection control circuits 22 and 24 may be simple circuits which connect directly the terminal pins P3 and P5 to the respective load circuits 18 and 20.

According to the power source connecting apparatus for plug-in unit, the power supplying paths of the lines LN1, LN2 and LN4 connected simultaneously with the terminal pins P1, P2 and P4 of the plug-in connector 10 is controlled by the connection control circuits 12, 14 and 16. The line LN1 is connected responsive to the connection of the line LN2 and the line LN4 is connected responsive to the connection of the lines LN1 and LN2. Therefore, the power source connecting apparatus for the plug-in unit can supply the inputs from the power sources to the load circuits 18 and 20 surely in a predetermined order.

Since the connection control circuit 22 and 24 for supplying the input from the power source to the respective load circuits 18 and 20 are further provided other than the connection control circuits 12, 14 and 16, the power supplying to the load circuits 18 and 20 can be achieved stably. In this case, since there is no need to utilize a height difference of terminal pins of a plug-in connector 10 for controlling the timelag on the connection of the power sources, the height difference is used for the operation of the other connection control circuit after connection of the power source.

Second Embodiment

Figure 4:
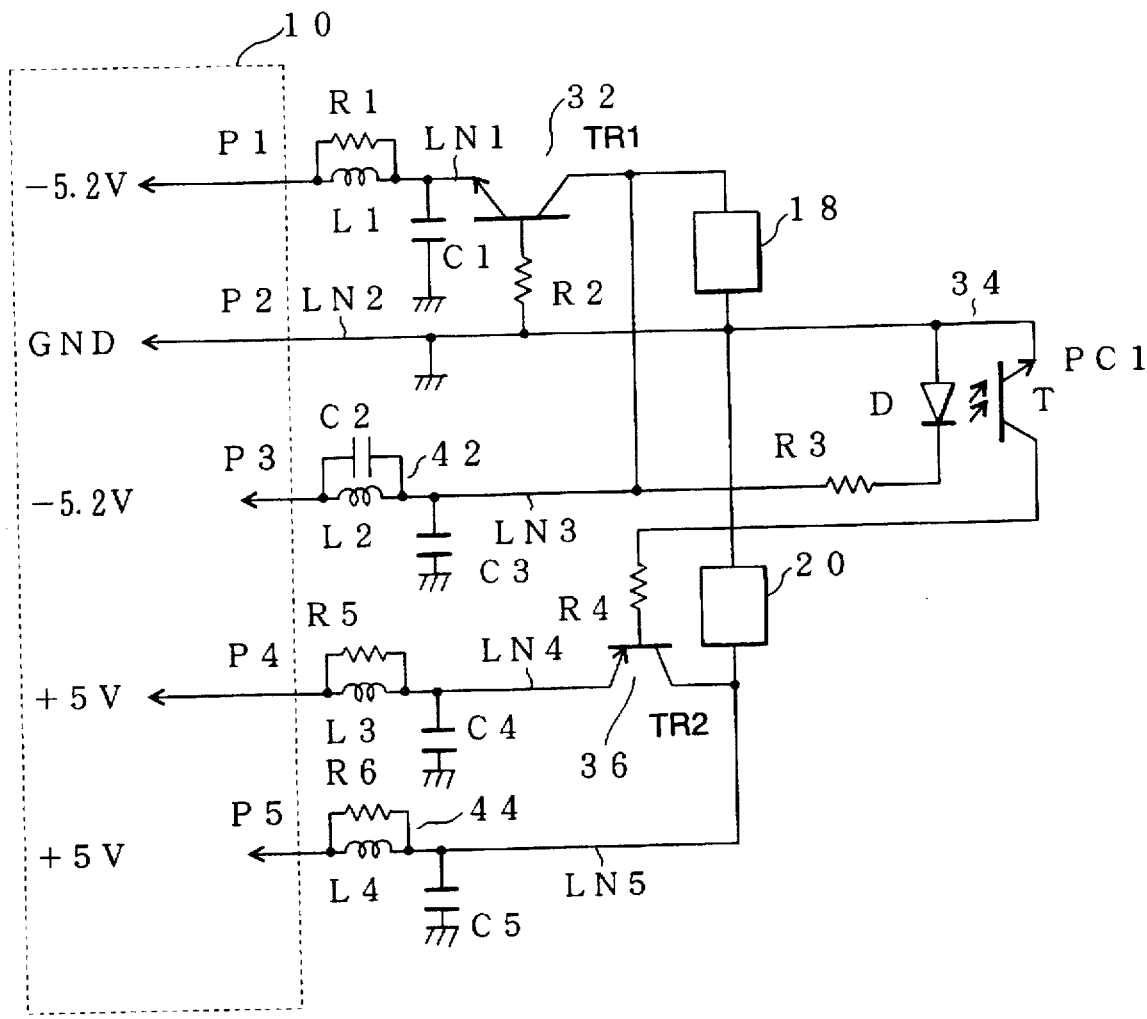
FIG. 4 is a circuit diagram showing the construction of an apparatus for connecting power sources with a plug-in unit according to a second embodiment of the present invention.

The construction of the second embodiment of a power source connecting apparatus for plug-in unit according to the present invention is shown in FIG. 4. The power source connecting apparatus for the plug-in unit of FIG. 4 is constructed based on the apparatus of FIG. 3 and the same reference numerals are attached to the same portions as those of FIG. 3.

The power source connecting apparatus for the plug-in unit of FIG. 4 has the same plug-in connector 10, and load circuits 18 and 20 as shown in FIG. 3. The power source connecting apparatus for the plug-in unit further includes connection control circuits 32, 34, 36, 42 and 44 corresponding to the connection control circuits 12, 14, 16, 22 and 24 of FIG. 3.

Figure 5:
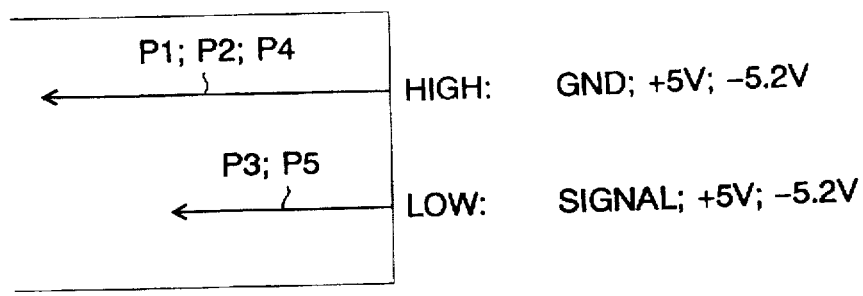
FIG. 5 is a typical diagram showing a construction of a plug-in connector of the power source connecting apparatus of FIG. 4.

The plug-in connector 10 is a multi-pin connector having terminal pins P1 through P5. These terminal pins P1 through P5 have a two stage structure of the terminal pins P1, P2 and P4 of a tall size (which is a high group), and the terminal pins P3 and P5 of a short size (which is a low group) as shown in FIG. 5.

The terminal pins P1, P2 and P4 of the high group are coupled to lines LN1, LN2 and LN4, respectively. The terminal pins P1, P2 and P4 are connected simultaneously to a negative power source (−5.2V), a GND and a positive power source (+5V) of an external parent apparatus, respectively.

The terminal pins P3 and P5 of the low group are coupled to lines LN3 and LN5, respectively. The terminal pins P3 and P5 are connected synchronously to the negative power source (−5.2V), the GND and the positive power source (+5V) of an external parent apparatus, respectively, after the connection of terminal pins P1, P2 and P4.

The load circuits 18 and 20 which are constructed with logic circuits, for example, accomplish the main function of the plug-in unit. The load circuit 18 uses the negative power source (−5.2V), and the load circuit 20 uses the positive power source (+5V). In this case, the order of supplying power to the load circuits 18 and 20 must be the sequence of the GND→the negative power source (−5.2V)→the positive power source (+5V).

The internal circuit of the plug-in unit includes transistors TR1, TR2, resistors R1–R6, coils L1–L4, capacitors C1–C5 and a photocoupler PC1.

The connection control circuit 32 includes an npn transistor TR1. The base of the transistor TR1 is connected to the GND line LN2 through resistor R2. The line LN2 is connected to terminal pin P2 of the plug-in connector 10 and is also connected to the GND side, i.e., one and of both the load circuits 18 and 20. The collector of the transistor TR1 is connected to the other end of the load circuit 18 and is also connected to the line LN3. The emitter of the transistor TR1 is connected to the line LN1.

The connection control circuit 34 includes a photocoupler PC1 constituted by a light emitting diode D and a npn phototransistor T. The anode of the light emitting diode D and the emitter of the phototransistor T are connected to the GND line LN2 in common. The cathode of the light emitting diode D is connected to the collector of the transistor TR1 of the connection control circuit 32 through the resistor R3.

The connection control circuit 36 includes a pnp transistor TR2. The base of the transistor TR2 is connected to the collector of the phototransistor T of the connection control circuit 34 through the resistor R4. The collector of the transistor TR2 is connected to the other end of the load circuit 20 and is also connected to the line LN5. The emitter of the transistor TR2 is connected to the line LN4.

The connection control circuit 42 is a kind of a time constant circuit and includes a capacitor C2, C3 and a coil L2. The capacitor C2 and the coil L2 are connected in parallel. The parallel circuit of the capacitor C2 and the coil L2 is inserted between the terminal pin P3 and the line LN3. The capacitor C3 is connected between the line LN3 and the GND line LN2.

In this case, the connection control circuit 44 is also a kind of a time constant circuit and includes a resistor R6, a coil L4 and a capacitor C5. The resistor R6 and the coil L4 are connected in parallel. The parallel circuit of the resistor R6 and the coil L4 is inserted between the terminal pin P5 and the line LN5. The capacitor C5 is connected between the line LN5 and the GND line LN2.

A time constant circuit having the similar construction to the connection control circuit 44 is provided between the terminal pin P1 and the line LN1. The time constant circuit includes a resistor R1, a coil L1 and a capacitor C1.

Another time constant circuit having the similar construction to the connection control circuit 44 is also provided between the terminal pin P4 and the line LN4. The time constant circuit includes a resistor R5, a coil LB and a capacitor C4.

Next, the operation of the power source connecting apparatus for plug-in unit constructed as FIG. 4 will be described.

As mentioned above, the input from the power source must be supplied in the order of the GND→the negative power source (−5.2V)→the positive power source (+5V).

Since the multi pin connector 10 has two stages, the high group of the terminal pins P1, P2 and P4, are used for an earth, i.e., GND and power supply upon insertion, and the low group of the terminal pins P3 and P5 are used for a signal and power supply for stabilizing after insertion.

When the plug-in unit is inserted, at first the high group of the terminal pins P1, P2 and P4 are connected to the negative power source (−5.2V), the GND and the positive power source (+5V), respectively. The line LN2 connected directly to the terminal pin P2 falls into GND potential instantly. The negative power source (−5.2V) and the positive power source (+5V) are not applied to the circuit elements of the load circuits 18 and 20 within the unit till the transistor TR1 of the connection control circuit 32 is turned ON. Therefore, the GND is first connected to the circuit elements of the load circuits 18 and 20.

When the connection of the GND is performed and the negative power source (−5.2V) is applied to the emitter of the transistor TR1 of the connection control circuit 32 through the line LN1, the transistor TR1 is turned ON and the negative power source (−5.2V) is supplied to the load circuit 18.

Next, when the transistor TR1 of the connection control circuit 32 is turned ON, the negative power source (−5.2V) is applied to the light emitting diode D of the photocoupler PC1 of the connection control circuit 34 and phototransistor T of the photocoupler PC1 is turned ON. At this time, since the positive power source (+5V) is supplied to the emitter of the transistor TR2 of the connection control circuit 36 through the line LN4, the emitter-base circuit of the transistor TR2 is biased in normal direction and the transistor TR2 is turned ON. Turning ON of the transistor TR2 supplies the positive power source (+5V) to the load circuit 20 within the unit.

As described above, when the plug-in connector 10 is connected, in spite of the order of connection of the high group of the terminal pins P1, P2 and P4 with the negative power source (−5.2V), the GND and the positive power source (+5V), the input from the power source supplies to the load circuits 18 and 20 in the order of the GND→the negative power source (−5.2V)→the positive power source (+5V).

The negative power source (−5.2V) and the positive power source (+5V) assigned to the low group of the terminal pins P3 and P5 are effective to stabilize supplying the input from the power source by the high group of the terminal pins P1, P2 and P4. As a result of connecting the low group of the terminal pins P3 and P5 the inputs from the negative power source (−5.2V) and the positive power source (+5V) are supplied to the load circuits 18 and 20 from the lines LN3 and LN5 without passing the transistors TR1 and TR2, and transistor TR1 and TR2 are turned OFF. Therefore the change of the voltage of the power source such as drop of the voltage and the power consumption of the transistors TR1 and TR2 can be prevented.

Third Embodiment

Figure 6:
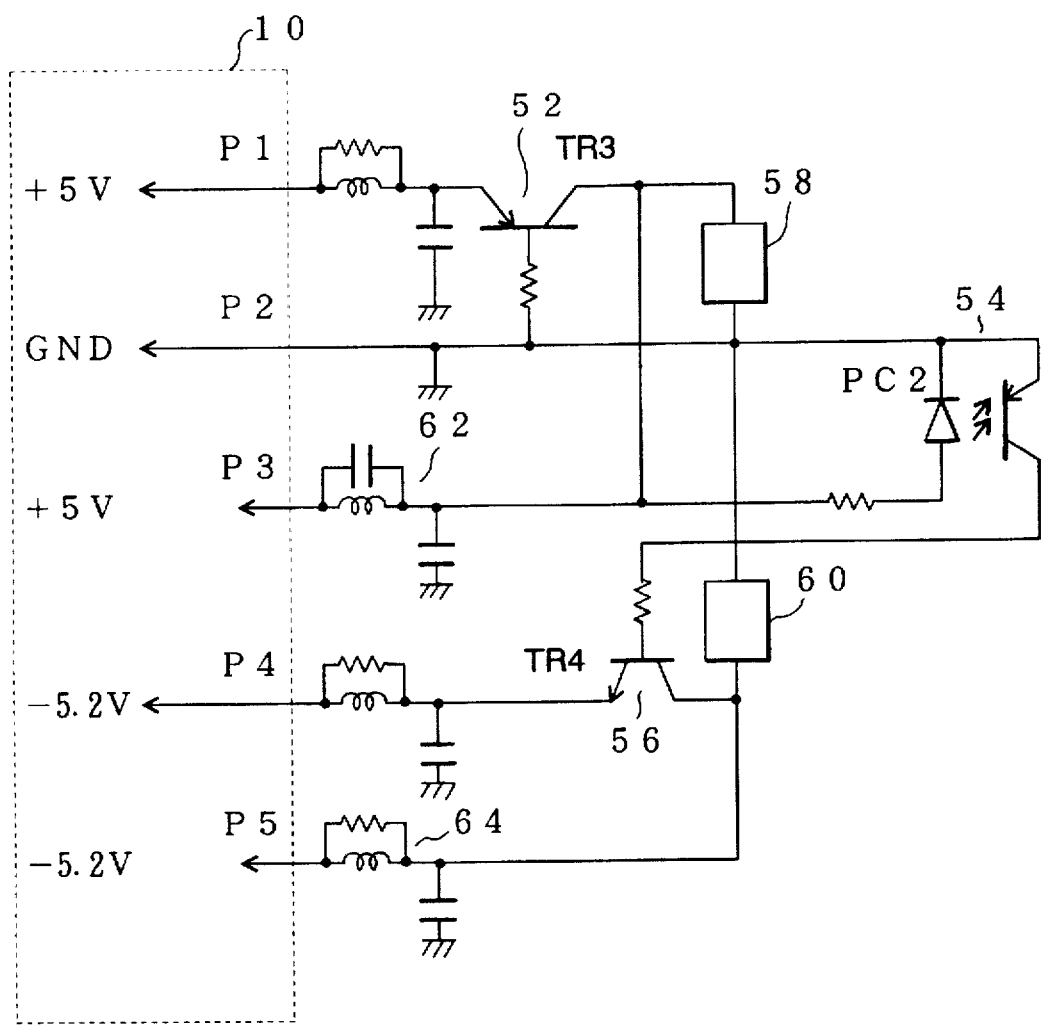
FIG. 6 is a circuit diagram showing the construction of an apparatus for connecting power sources with a plug-in unit according to a third embodiment of the present invention.

The construction of the third embodiment of a power source connecting apparatus for plug-in unit according to the present invention is shown in FIG. 6.

The power source connecting apparatus for the plug-in unit of FIG. 6 has the same plug-in connector 10 as shown in FIG. 4, and includes connection control circuits 52, 54, 56, 62, 64, load circuits 58 and 60 corresponding to the connection control circuits 32, 34, 36, 42, 44, load circuits 18 and 20 of FIG. 4.

The terminal pins P1, P2 and P4 of the high group are connected simultaneously to a positive power source (+5V), a GND and a negative power source (−5.2V) of an external parent apparatus, respectively. The terminal pins P3 and P5 of the low group are connected simultaneously to the positive power source (+5V), the GND and the negative power source (−5.2V) of an external parent apparatus, respectively, after the connection of terminal pins P1, P2 and P4.

In this case, the load circuit 58 uses the positive power source (+5V), and the load circuit 60 uses the negative power source (−5.2V). The order of supplying power to the load circuits 58 and 60 must be the sequence of the GND→the positive power source (+5V)→the negative power source (−5.2V).

The connection control circuit 52 includes a pnp transistor TR3. When the GND and the positive power source (+5V) is applied to the base and the emitter, respectively, the transistor TR3 is turned ON and then the output of the positive power source (+5V) is supplied to the load circuit 58.

The connection control circuit 54 includes a photocoupler PC2 constituted by a light emitting diode and a pnp phototransistor as shown in FIG. 6. The phototransistor of the photocoupler PC2 is turned ON when the transistor TR3 of the connection control circuit 52 is turned ON.

The connection control circuit 56 includes a npn transistor TR4. When the GND and the negative power source (−5.2V) are applied to the base and the emitter, respectively, as a result of turning ON of the connection control circuit 54, the transistor TR4 is turned ON and then the output of the negative power source (−5.2V) is supplied to the load circuit 60.

Each of the connection control circuits 62 and 64 is also a kind of a time constant circuit. The connection control circuits 62 and 64 supply the outputs of the positive power source (+5V) and the negative power source (-5.2V) which are supplied as a result of connecting the low Group of the terminal pins P3 and P5 to the load circuit 58 and 60, and stabilize the power supply and turn OFF the transistors TR3 and TR4.

As described above, when the plug-in connector 10 is connected, the inputs from the power source are supplied surely to the load circuits 58 and 60 in the order of the GND→the positive power source (+5V)→the negative power source (-5.2V).

Fourth Embodiment

Figure 7:
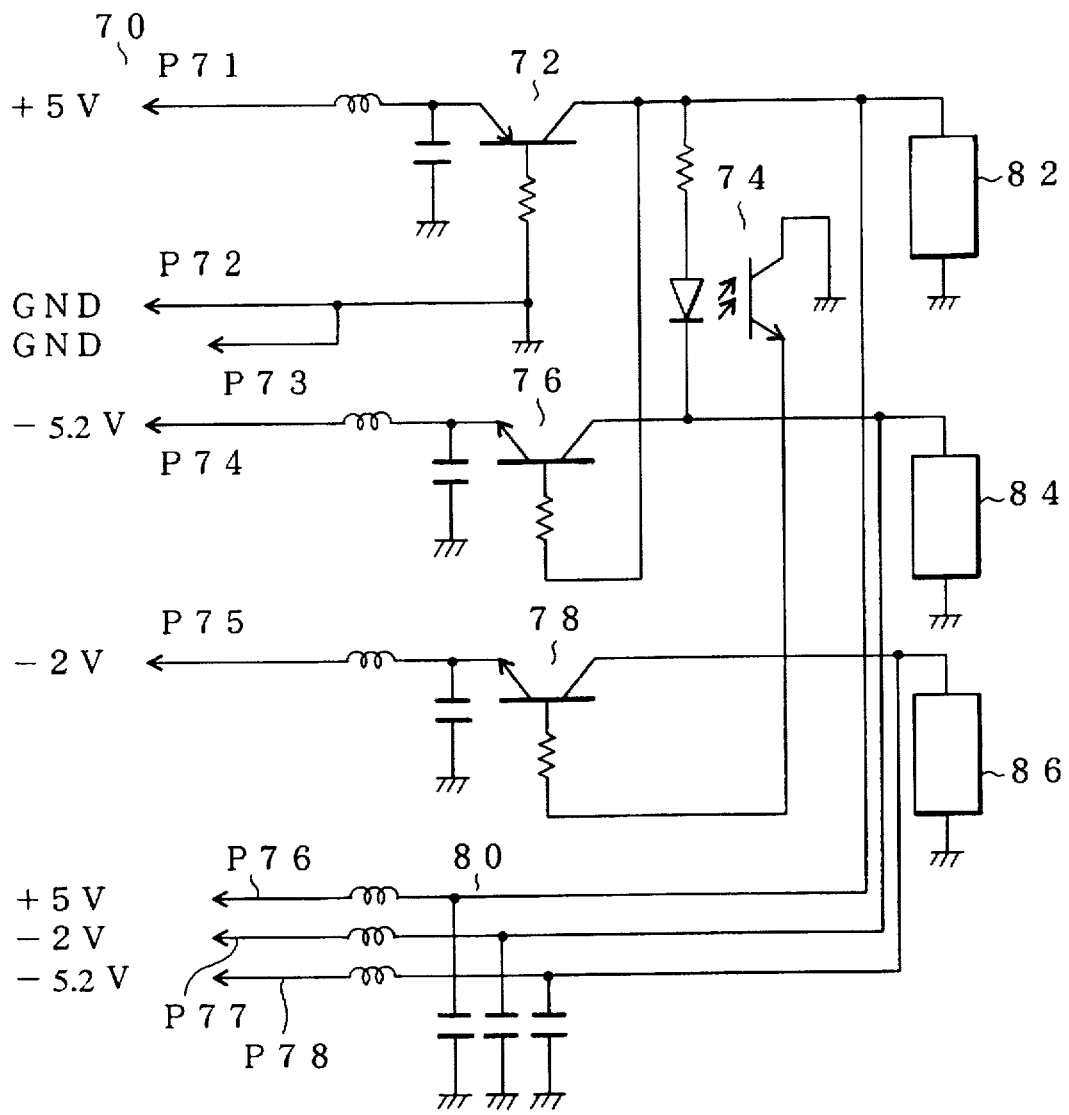
FIG. 7 is a circuit diagram showing the construction of an apparatus for connecting power sources with a plug-in unit according to a fourth embodiment of the present invention.

The construction of the fourth embodiment of a power source connecting apparatus for the plug-in unit according to the present invention is shown in FIG. 7.

The power source connecting apparatus for the plug-in unit of FIG. 7 is the apparatus having three voltages of the power source, and includes a plug-in connector 70, a connection control circuits 72, 74, 76, 78, 80, load circuits 82, 84 and 86.

In this case, the load circuits 82, 84 and 86 use the power source of +5V, -5.2V and -2V, respectively. The order of supplying the inputs from the power sources to the load circuits 82, 84 and 86 must be the sequence of the GND→+5V→,-5.2V→-2V.

The plug-in connector 70 has terminal pins P71 through P78. The terminal pins P71, P72, P74 and P75 form a high group of the terminal pins, and the terminal pins P73, P76, P77 and P78 form a low group of the terminal pins. When the plug-in connector 70 is connected, the terminal pins P71, P72, P74 and P75 of the high group are connected to the power sources of 5V, the GND, -5.2V and -2V, and the terminal pins P73, P76, P77 and P78 of the low group are connected to the power sources of the GND, +5V -2V and -5.2V.

When the terminal pins P71, P72, P74 and P75 of the high group are connected to the power sources of +5V, the GND, -5.2V and -2V as a result of the connection of the plug-in connector 70, the GND potential of the respective parts is established first.

The connection control circuit 72 is turned ON by the connection of the terminal pins P71 and P72, and the input from the power source of +5V is supplied to the load circuit 82. The connection control circuit 76 is turned ON in response to the accomplishment both the connection of the terminal pin P74 and the turn-ON operation of the connection control circuit 72, and the input from the power source of -5.2V is supplied to the load circuit 84. The connection control circuit 74 is turned ON when both of the connection control circuits 72 and 76 are turned ON. The connection control circuit 78 is turned ON in response to the accomplishment both of the connection of the terminal pin P75 and the turn-ON operation of the connection control circuit 74, and the input from the power source of -2V is supplied to the load circuit 86.

Thereafter, when the terminal pins P73, P76, P77 and P78 are connected to the power sources of the GND, +5V, -2V and -5.2V, the connection control circuit 80 accomplishes the stabilized supply of the power inputs from the power sources +5V, -5.2V and -2V to the load circuits 82, 84, and 86, and turns OFF the transistors of the connection control circuits 72, 76 and 78.

Thus, the power source connecting apparatus for plug-in unit can supply the inputs of three voltages from the power sources to the load circuits in the predetermined order.

Further, a power source connecting apparatus for plug-in unit of a multi-stage construction can be formed by combining the same constructions as described above in cascade and many power sources can be supplied to the load circuits in a predetermined order.

The above described power supplying order is determined either by a characteristic of a device forming load circuits, or by a type of a supplied signal to the load circuits.

Figure 8:
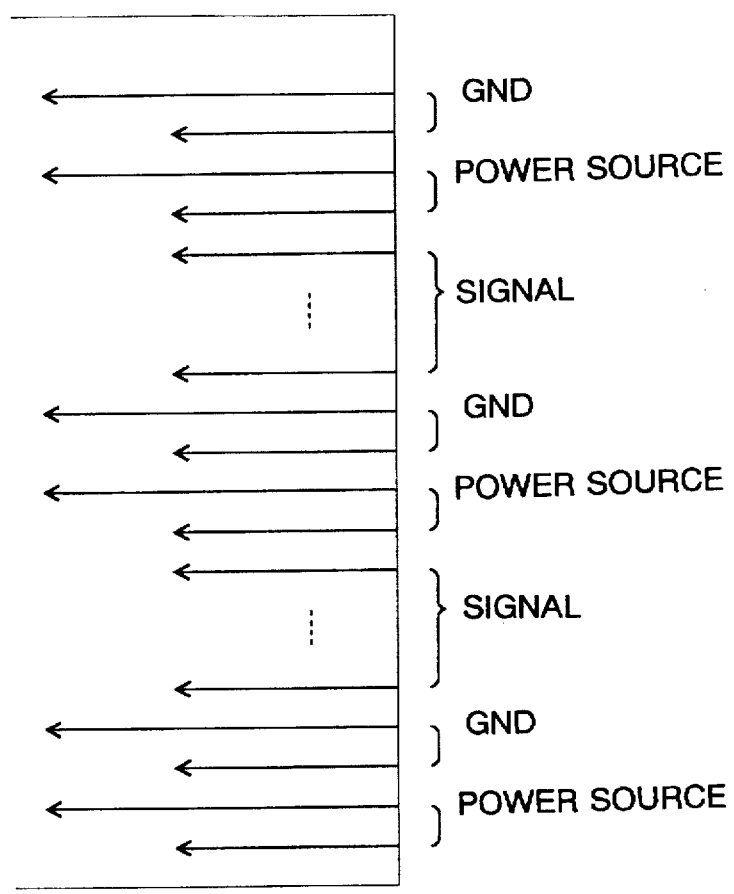
FIG. 8 is a typical diagram showing the construction of an arrangement of terminal pins of a plug-in connector according to another embodiment of the present invention.

Furthermore, terminal pins of a plug-in connector may arrange the order of high (tall) and low (short) terminal pins for GND, high and low terminal pins for positive or negative power sources, a group of short terminal pins for signals, high and low terminal pins for GND, high and low terminal pins for the other positive or negative power sources, . . . . as shown in FIG. 8. This arrangement of pins provides uniform distribution of the multi-height pins for GND and power sources in a connector plug, so that any effect on the connecting order by a bend of part of the connector plug can be decreased.

It is apparent that, in this invention, a wide range of different working modes can be formed based on the invention without deviating from the spirit and scope of the invention.

What is claimed is:

1. An Apparatus for connecting power sources to a plug-in unit comprising:

a plug-in connector which has a plurality of terminal pins;

first and second load circuits in the plug-in unit, said first and second load circuits to be connected to the power sources sequentially;

a first connection control circuit for supplying a first power input to said first load circuit in response to a first control signal, in which said first power input is supplied from a first terminal of said plug-in connector and said first control signal is inputted from a second terminal different from said first terminal, said second terminal being connected to said first and second load circuits;

a second connection control circuit for generating a second control signal in response to an operation of said first connection control circuit; and a third connection control circuit for supplying a second power input to said second load circuit in response to said second control signal, in which said second power input is supplied from a third terminal of said plug-in connector different from said first and second terminals;

said first control signal being supplied to said first and second load circuits as a third power input different from said first and second power inputs.

2. An apparatus according to claim 1, wherein said second terminal is a terminal for supplying a common potential of said power sources to said first and second load circuits.

3. An apparatus according to claim 1, wherein said first through third connection control circuits include an electronic switch turning ON and turning OFF an object circuit responsive to a control signal.

4. An apparatus according to claim 3, wherein said electronic switch includes a semiconductor switch turning ON and turning OFF said object circuit responsive to said control signal.

5. An apparatus according to claim 3, wherein said electronic switch includes a photocoupler having a light emitting element turned ON by said control signal and a semiconductor switch connecting said object circuit responsive to a light from said light emitting element.

6. An apparatus for connecting power sources with a plug-in unit comprising:

a plug-in connector which has a first terminal group firstly connected and a second terminal group connected after connection of said first terminal group on mounting of a plug-in unit;

first and second load circuits in the plug-in unit, said first and second load circuits to be connected to the power sources sequentially;

a first connection control circuit for supplying a first power input to said first load circuit in response to a first control signal, in which said first power input is supplied from said first terminal of said first terminal group and said first control signal is inputted from a second terminal of said first terminal group different from said first terminal;

a second connection control circuit for generating a second control signal in response to an operation of said first connection control circuit;

a third connection control circuit for supplying a second power input to said second load circuit in response to a second control signal from said second connection control circuit, in which said second power input is supplied from a third terminal of said first terminal group different from said first and second terminals; and a fourth connection control circuit for supplying predetermined power inputs to said first and second load circuits in response to connection of terminals of said second terminal group.

7. An apparatus according to claim 6, wherein said second terminal is a terminal for supplying a common potential of said power sources to said first and second load circuits.

8. An apparatus according to claim 6, wherein said first through third connection control circuits include an electronic switch turning ON and turning OFF an object circuit responsive to a control signal.

9. An apparatus according to claim 8, wherein said electronic switch includes a semiconductor switch turning ON and turning OFF said object circuit responsive to said control signal.

10. An apparatus according to claim 8, wherein said electronic switch includes a photocoupler having a light emitting element turned ON by said control signal and a semiconductor switch connecting said object circuit responsive to said light from said light emitting element.

11. An apparatus according to claim 6, wherein said fourth connection control circuit includes a circuit for supplying first and second inputs of power sources directly to said first and second load circuits, respectively, said first and second inputs being supplied from said second terminal group.

12. An apparatus for connecting power sources with a plug-in unit comprising:

a plug-in connector which has a plurality of terminal pins;

a plurality of load circuits, in the plug-in unit, said load circuits to be connected to the power sources sequentially in a predetermined order;

a first connection control circuit for supplying a power input to one of said load circuits in response to a first control signal, in which said power input is supplied from a predetermined terminal of said plug-in connector and said first control signal is inputted from another predetermined terminal of said plug-in connector said another predetermined terminal being connected to each of said plurality of load circuits;

a plurality of second connection control circuits for supplying other power inputs to the rest of said load circuits in response to second control signals, in which said other power inputs are supplied from other predetermined terminals of said plug-in connector; and a plurality of third connection control circuits for generating said second control signals in response to an operation of said first and second connection control circuits, and for supplying said second control signals to said second connection control circuits sequentially;

said first control circuit being supplied to said plurality of load circuits as an additional power input.

13. An apparatus according to claim 12, further comprising a fourth connection control circuit for supplying predetermined power inputs to said load circuits in response to connection of terminals of said plug-in connector after said predetermined terminal.

14. An apparatus for connecting power sources with a plug-in unit comprising:

a plug-in connector which has a plurality of terminal pins;

a plurality of load circuits in the plug-in unit, said load circuits to be connected to the power sources sequentially in a predetermined order;

a first connection control circuit for supplying a power input to one of said load circuits in response to a first control signal, in which said power input is supplied from a predetermined terminal of said plug-in connector and said first control signal is inputted from another predetermined terminal of said plug-in connector;

a plurality of second connection control circuits for supplying other power inputs to the rest of said load circuits in response to second control signals, in which said other power inputs are supplied from other predetermined terminals of said plug-in connector;

a plurality of third connection control circuits for generating said second control signals in response to an operation of said first and second connection control circuits, and for supplying said second control signals to said second connection control circuits sequentially; and a fourth connection control circuit for supplying predetermined power inputs to said load circuits in response to connection of terminals of said plug-in connector after said predetermined terminal.

* * * * *